(12) United States Patent
Yang et al.

(10) Patent No.: US 7,747,550 B2
(45) Date of Patent: Jun. 29, 2010

(54) SYSTEM AND METHOD FOR DESIGNING A FREE FORM REFLECTOR USING GENETIC ALGORITHM

(75) Inventors: Bo Yang, Beijing (CN); Ying-Bai Yan, Beijing (CN); Xing-Peng Yang, Beijing (CN); Guo-Fan Jin, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 906 days.

(21) Appl. No.: 11/552,977

(22) Filed: Oct. 26, 2006

(65) Prior Publication Data
US 2007/0219760 A1    Sep. 20, 2007

(30) Foreign Application Priority Data
Mar. 17, 2006  (CN) .................... 2006 1 0034546

(51) Int. Cl.
*G06F 15/18*    (2006.01)
(52) U.S. Cl. ........................................ 706/16
(58) Field of Classification Search .................. 706/12, 706/16; 700/97; 362/231, 297, 497, 510, 362/641, 511, 509, 512; 703/1
See application file for complete search history.

(56) References Cited

U.S. PATENT DOCUMENTS
7,097,334 B2    8/2006  Ishida et al.
2004/0174704 A1  9/2004  Hsu et al.

OTHER PUBLICATIONS

Yang, Bo, Wang, Yongtian, Computer-aided design and optimization of free-form reflectors, Optical Design and Testing II, edited by Yongtian Wang, Zhicheng Weng, Shenghua Ye, José M. Sasián, Proc. of SPIE vol. 5638 (SPIE, Bellingham, WA, 2005).*
Hicks, R. A., Designing a mirror to realize a given projection, Journal of Optical Society of America A, vol. 2 (2), 2005.*

* cited by examiner

*Primary Examiner*—Donald Sparks
*Assistant Examiner*—Ola Olude-Afolabi
(74) *Attorney, Agent, or Firm*—Wei Te Chung

(57) ABSTRACT

A system for designing a free form reflector includes a user input interface (1), a free form reflector design unit (2), and a free form reflector output unit (3). The user input interface is configured for receiving various data associated with a desired free form reflector, via an input device. The free form reflector design unit is installed in a computer and configured for generating an optimum free form surface according to the input data by performing a non-uniform rational basis splines (NURBS) algorithm, a merit evaluation function, and a differential evolution (DE) algorithm. The free form reflector output module is configured for generating a free form reflector according to the optimum free form surface and outputting the free form reflector, in the form of a computer-aided design (CAD) drawing, to a display and/or a printer. A related method is also disclosed.

8 Claims, 18 Drawing Sheets

SYSTEM AND METHOD FOR DESIGNING A FREE FORM REFLECTOR USING GENETIC ALGORITHM

BACKGROUND OF THE INVENTION

1. Field of the Invention

The present invention generally relates to systems and methods for designing reflectors and, more particularly, to a system and method for designing a free form reflector.

2. Description of Related Art

Non-imaging reflectors are widely used in illumination and solar energy systems. In these applications, a non-imaging reflector is designed to convert the Lambertian source into a beam with a divergence of half-angle θ without loss of throughput. One direct design approach is to using algebraic methods, among which a tailored edge ray approach has made a great success. In this approach, a two-dimensional (2D) reflector is determined by reflector equations that are deduced from an edge-ray method and conservation of energy. For a three dimensional (3D) reflector design, it is common to solve the problem by reducing three dimensions to two dimensions. Thus, a 3D reflector can be generated by means of rotational or translational symmetry. The second approach is indirect, and it uses optimization-based design techniques. The analytic knowledge of the connection between the reflector structure and optical performance is not needed. Free form surfaces, such as a Bézier surface and a non-uniform rational basis splines (NURBS) surface, are appropriate to represent the shape of a reflector in these automated design approaches.

A genetic algorithm has been proven to be valuable both in imaging and non-imaging optics since Holland laid down the basic principles of genetic algorithms. A differential evolution (DE) is a variation of the genetic algorithm proposed by R. Storn and K. Price. The DE stood out in the first IEEE conference on evolutionary computation, and then it was widely applied in various fields. Compared with standard the genetic algorithm, the DE uses floating point variables. In addition, the crossover and mutation implementations are more complex. The NURBS is a powerful technique for constructing general curves and surfaces. It has many good properties, for example, the order of the surface is independent of the number of control points. Local changes to the surface shape are possible because individual control points have only local influences. The algorithm combines the global search capability of the DE with the flexibility of the shape adjustment of free form surface, which has been used in the second approach of reflector design. S. Doyle used cubic Bézier curve to represent the profile of a reflector, and thus a paraboloid and ellipse reflector can be obtained by using his algorithm.

For the design of a non-imaging reflector, what is needed is a system and method for designing a free form reflector that performs an automated free form reflector generation, which can be applied for the design of more general reflectors.

SUMMARY OF THE INVENTION

A preferred embodiment of a system for designing a free form reflector, in accordance with a preferred embodiment, includes a user input interface, a free form reflector design unit, and a free form reflector output unit. The user input interface is configured for receiving various data associated with a desired free form reflector from an input device. The free form reflector design unit is installed in a computer and configured for generating an optimum free form surface, according to the input data by performing a non-uniform rational basis splines (NURBS) algorithm, a merit evaluation function, and a differential evolution (DE) algorithm. The free form reflector output module is configured for generating a free form reflector according to the optimum free form surface and for outputting a free form reflector in the form of a computer-aided design (CAD) drawing to a display and/or a printer.

The free form reflector design unit includes: an NURBS algorithm generating module configured for generating an NURBS algorithm, according to data received by the user input interface, and for describing a free form surface by performing the NURBS algorithm; an merit evaluation function constructing module configured for constructing a merit evaluation function in order to calculate the difference between a desired illuminance distribution and a current distribution generated by a receiver; an DE algorithm generating module configured for generating an DE algorithm to facilitate a calculation of an optimum free form surface; and a free form surface building module configured for building an optimum free form surface according to the NURBS algorithm, the merit evaluation function, and the DE algorithm.

Another preferred embodiment provides a computerized method for designing a free form reflector by utilizing the above system. The method includes the steps of: (a) receiving various data associated with a desired free form reflector; (b) generating an NURBS algorithm for describing a free form surface by performing the NURBS algorithm; (c) constructing a merit evaluation function for calculating the difference between a desired illuminance distribution and a current illuminance distribution generated by a receiver; (d) generating an DE algorithm to facilitate a calculation of an optimum free form surface; (e) building an optimum free form surface according to the NURBS algorithm, the merit evaluation function, and the DE algorithm; and (f) generating and outputting a free form reflector according to the optimum free form surface.

A reflector profile of the present system is represented by a cubic NURBS curve. The coordinates of control points are used as variables, and a merit function specific to non-imaging reflector design is presented. The DE is performed to generate the reflector. Comparing with S. Doyle's method, the present system and method uses the NURBS curve representation of a reflector profile and directly uses an illuminance value to calculate merit function value, so as to be more effective and robust.

Other advantages and novel features of the embodiments will be drawn from the following detailed description with reference to the attached drawings.

DETAILED DESCRIPTION OF THE INVENTION

Figure 1:
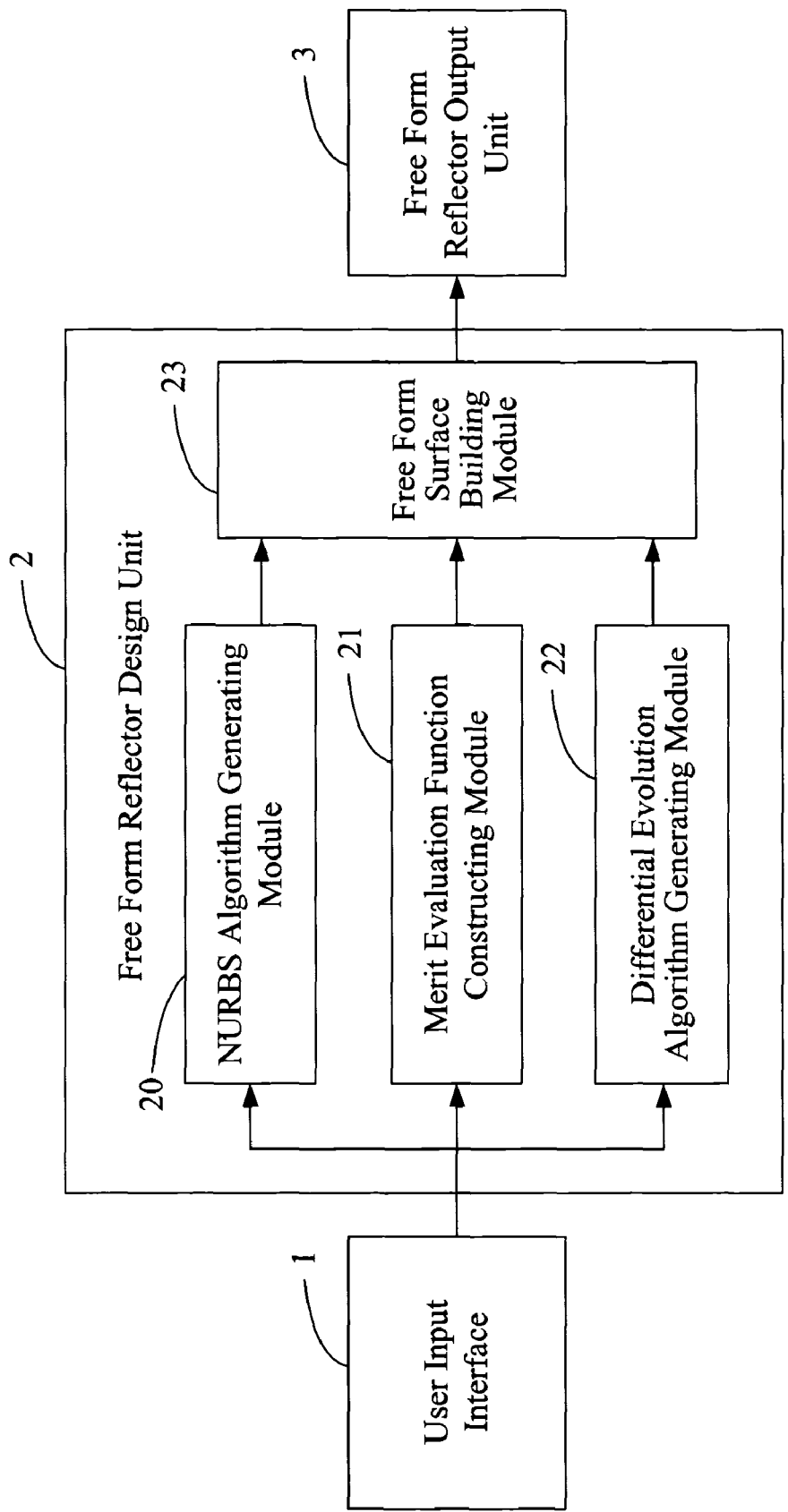
FIG. 1 is a schematic diagram of a system for designing a free form reflector, in accordance with a preferred embodiment.

FIG. 1 is a schematic diagram illustrating a system for designing a free form reflector (hereinafter "the system") in accordance with a preferred embodiment. The system mainly includes a user input interface 1, a free form reflector design unit 2 and a free form reflector output unit 3.

The user input interface 1 is configured for receiving various data associated with a desired free form reflector input by a user from an input device (e.g., a keyboard). The data typically include desired dimensions, desired illuminance distributions, and searching limits of the free form reflector.

The free form reflector design unit 2 installed in a computer is configured for generating an optimum free form surface according to the input data by performing a non-uniform rational basis splines (NURBS) algorithm, a merit evaluation function, and a differential evolution (DE) algorithm. The free form reflector design unit 2 includes an NURBS algorithm generating module 20, a merit evaluation function constructing module 21, an DE algorithm generating module 22, and a free form surface building module 23.

The NURBS algorithm generating module 20 is configured for generating a non-uniform rational basis splines (NURBS) algorithm according to the data received by the user input interface 1, and for describing a free form surface by performing the NURBS algorithm. The NURBS has become an industry standard for the representation, design, and data exchange of geometric information processed by computers. The excellent mathematical and algorithmic properties, combined with successful industrial applications, have contributed to the enormous popularity of the NURBS. The mathematical expression of a NURBS curve is described as the first equation:

$$\vec{C}(u) = \frac{\sum_{i=0}^{n} N_{i,p}(u) w_i \vec{P}_i}{\sum_{i=0}^{n} N_{i,p}(u) w_i}$$

$$0 \leq u \leq 1.$$

In the first equation, $\vec{C}(u)$ is a vectorial expression of parametric equations; $N_{i,p}(u)$ are B-Spline Basic Functions; $\vec{P}_i$ are vectors of control points; u is a parameter; $W_i$ is the weight for the control point i; p is the basic function degree; and n+1 is the number of the control points. The control points form what is called the 'control polygon'. There are two parametric equations in two dimensional (2D) space and one for each coordinate. The equations are a function of the parameter u. Each control point has a weighting factor associated with it. The weighting factor has the effect of pulling the curve closer to that control point. In the preferred embodiment, a cubic NURBS curve with four control points is used as the reflector profile representation, and the NURBS curve knots are {0,0,0,0,1,1,1,1}, so the head control points and the tail control points are superposed on the endpoints of the NURBS curve.

The merit evaluation function constructing module 21 is configured for constructing a merit evaluation function in order to calculate the difference between the desired illuminance distribution and a current distribution generated by a current reflector. In the preferred embodiment, a receiver is divided to m×n mesh. The illuminance value of each bin is calculated when the merit evaluation function is defined as the second equation:

$$F = \sum_{i=1}^{m} \sum_{j=1}^{n} W_{ij}(E_{ij} - E'_{ij})^2.$$

In the second equation, $W_{ij}$ is the weight value of each bin; and $E_{ij}$ and $E_{ij}'$ are the calculated illuminance value and the desired illuminance value of the bin with the serial number (i and j), respectively. If the uniform illuminance distribution is required on the receiver, $E_{ij}'$ is replaced with a constant value $E_0$ in the merit evaluation function.

The DE algorithm generating module 22 is configured for generating a differential evolution (DE) algorithm to facilitate a calculation of an optimum free form surface. With the merit evaluation function defined and the coordinates of the control points of a reflector profile used as variables, the DE algorithm is performed to determine the reflector shape/contour that generates the desired illuminance distribution. Referring to the string of the numbers that characterize the reflector profile as being a chromosome and the numbers that compose the chromosome, i.e., the NURBS curve controls the point coordinates and weights, in a manner similar to genes. The DE algorithm performs the steps as follows.

Step (i), initializing population generation: randomly generating genes of an initial chromosome in a population between maximum and minimum values therefore, according to the following equation: $X(0)=(X_1(0), X_2(0), \ldots, X_N(0))$. In this equation, the iterative counter t=0; the initial population is X(0); N is the population size; and $X_{best}(0)$ is an optimum chromosome in the initial population.

Step (ii), mutation implementation: calculating a $i^{th}$ parent chromosome, according to the third equation:

$$V_i(t) = X_i(t) + \lambda[X_{best}(t) - X_i(t)] + \beta[X_{r2}(t) - X_{r1}(t)],$$
$$= (\overline{V}_1, \overline{V}_2, \ldots, \overline{V}_j, \ldots \overline{V}_M)^T$$
$$i = 1, 2, \ldots, N.$$

In the third equation, r1 and r2 are two random integers in [1, N]; $\lambda$ and $\beta$ are two parameters; M is the number of variables; and $\overline{V}_j$ is the $j^{th}$ gene of the $i^{th}$ parent chromosome.

Step (iii), crossover implementation: it is supposed that the $i^{th}$ child chromosome is $U_i(t)$, which is calculated according to the following equation: $U_i(t)=(\overline{u}_1, \overline{u}_2, \ldots, \overline{u}_M)^T$, i=1, 2, ..., N. The $j^{th}$ gene in the $i^{th}$ child chromosome is obtained by utilizing the fourth equation:

$$\overline{u}_j = \begin{cases} \overline{V}_j, & rand_{ij} \leq CR \text{ or } j = Rnd_i \\ [X_i(t)]_j, & \text{others} \end{cases},$$

$$j = 1, 2, \ldots, M.$$

In the fourth equation, CR is the crossover probability, which is depicted as $CR \in [0,1]$; $rand_{ij}$ is a random float point number between 0 and 1; and $Rnd_i$ is a random integer between 1 and M.

Step (iv), selection implementation: calculating a merit evaluation function value of the child chromosome and comparing the merit evaluation function value of the child chromosome with the merit evaluation function value of the initial chromosome. The initial chromosome is replaced with the child chromosome in the population, if the merit evaluation function value of the child chromosome is smaller than the merit evaluation function value of the initial chromosome. This selection implementation step is accomplished according to the fifth equation:

$$X_i(t+1) = \begin{cases} U_i(t) & \text{if } F(U_i(t)) < F(X_i(t)) \\ X_i(t) & \text{others} \end{cases},$$

i=1, 2, ..., N. In the fifth equation, F is the merit evaluation function defined by the second equation. The next chromosome is chosen for updating and step (ii) to step (iv) is repeated until the entire population has been processed.

Step (v), stop verification: the next generation of the population is $X(t+1)=(X_1(t+1), X_2(t+1), \ldots X_N(t+1))$, and the best chromosome in $X(t+1)$ is $X_{best}(t+1)$. Step (i) to step (v) are repeated until a desired minimum merit evaluation function value has been achieved or until the evolution has attained the maximum iteration times.

The free form surface building module 23 is configured for building an optimum free form surface of the reflector, according to the NURBS algorithm, the merit evaluation function, and the DE algorithm.

The free form reflector output module 3 is configured for generating a free form reflector according to the optimum free form surface and for outputting the free form reflector, in the form of a computer-aided design (CAD) drawing, to a display and/or a printer.

Figure 2:
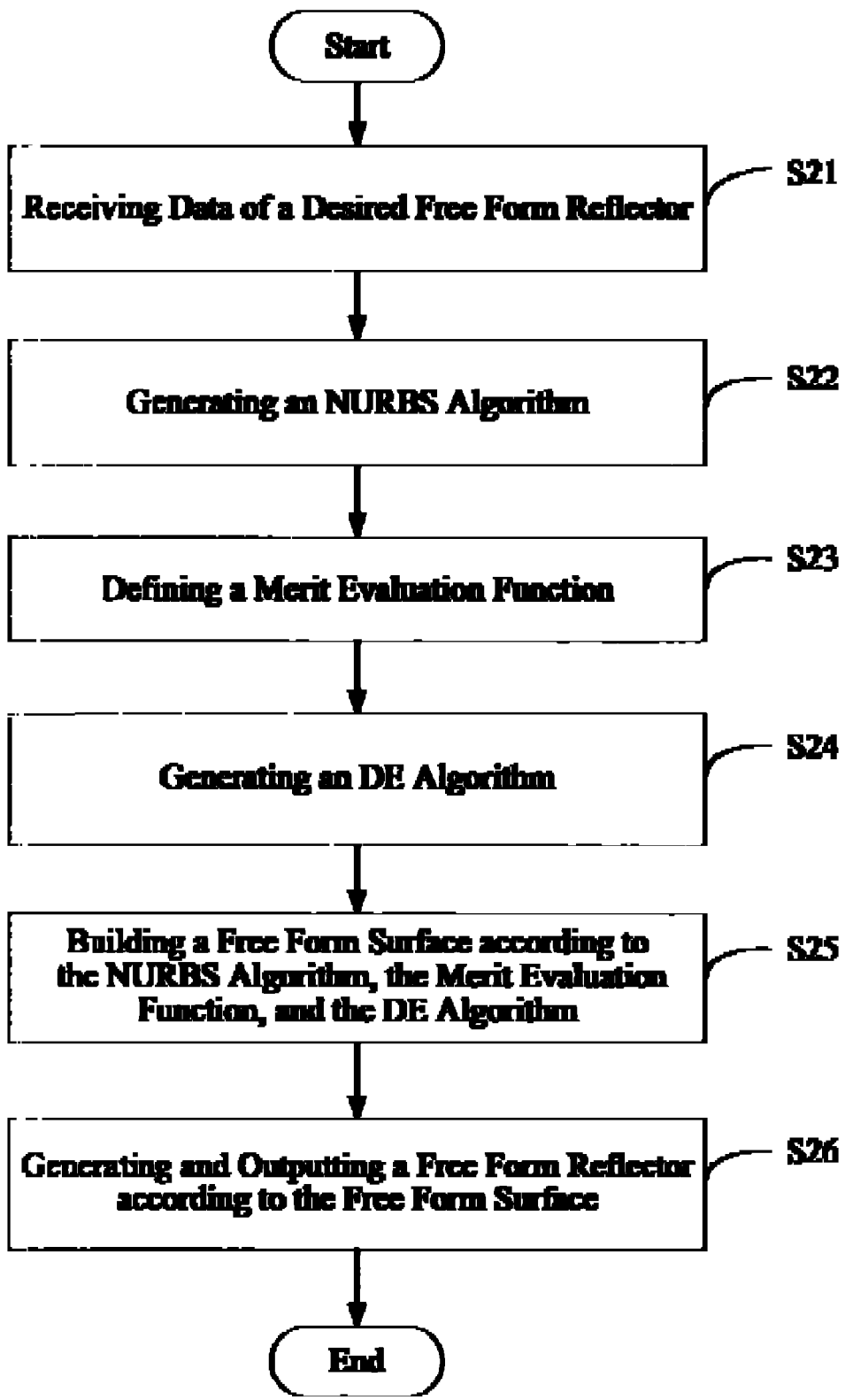
FIG. 2 is a flowchart of a preferred method for designing a free form reflector, by implementing the system of FIG. 1.

FIG. 2 is a flowchart of a preferred method for designing a free form reflector by implementing the system of FIG. 1. In step S21, the user input interface 1 receives various data associated with a desired free form reflector input by a user from an input device. The data typically may include desired dimensions, illuminance distributions, and searching limits of the free form reflector. In step S22, the NURBS algorithm generating module 20 generates a NURBS algorithm according to the data received by the user input interface 1 and describes a free form surface by performing the NURBS algorithm. In step S23, the merit evaluation function constructing module 21 generates a merit evaluation function for measuring the difference between the desired illuminance distribution and the distribution generated by a current reflector. In step S24, the DE algorithm generating module 22 outputs a differential evolution (DE) algorithm for use in determining an optimum free form surface. In step S25, the free form surface building module 23 builds an optimum free form surface of the reflector according to the NURBS algorithm, the merit evaluation function, and the DE algorithm. In step S26, the free form reflector output module 3 generates a free form reflector according to the optimum free form surface and outputs a free form reflector, in the form of a computer-aided design (CAD) drawing, to a display and/or a printer. Based upon the CAD drawing, the desired free form reflector can actually be manufactured.

Abundant numerical experiments show that the DE algorithm is an effective global optimization algorithm. Using the DE algorithm combined with the NURBS curve representation, an automated non-imaging reflector design algorithm is proposed. In the next sections, several examples are given to illustrate the validity of the system and method described above.

Figure 3:
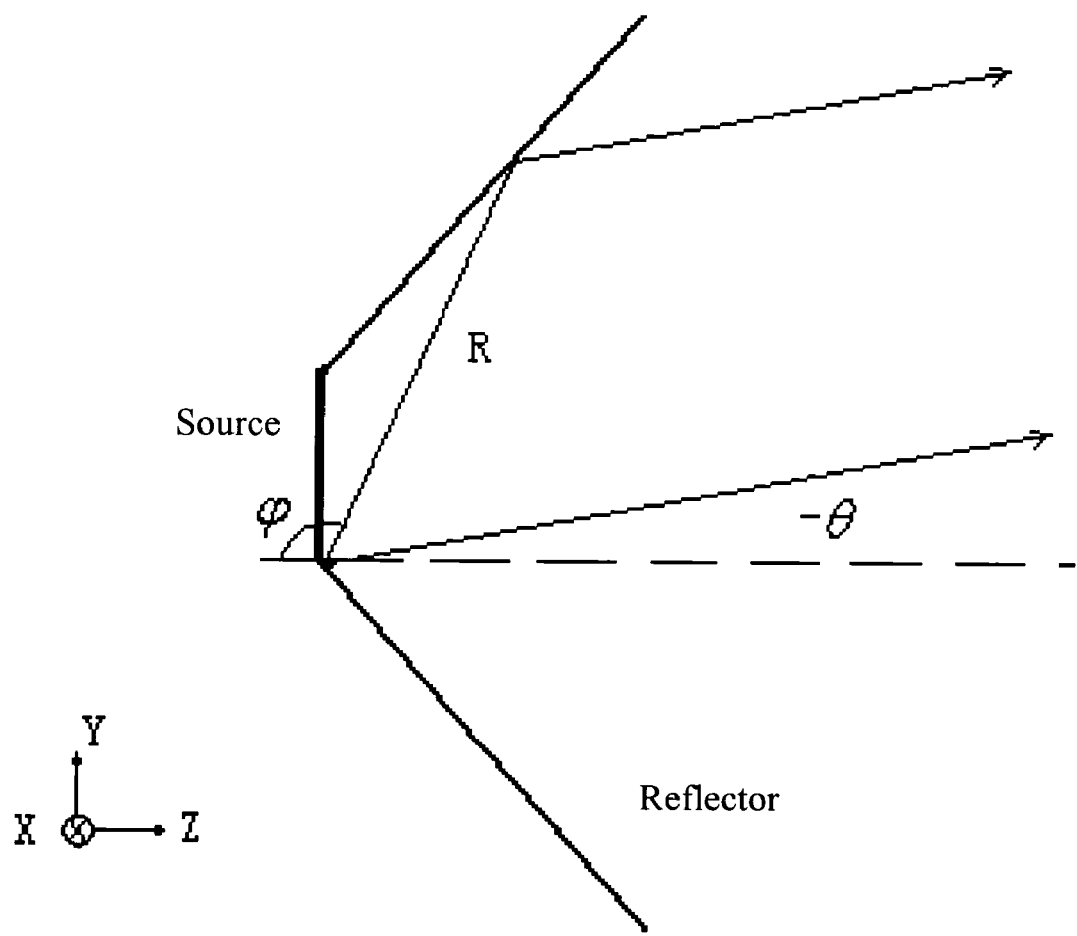
FIG. 3 is a schematic diagram illustrating a reflector profile of the free form reflector in polar coordinates, in accordance with the preferred embodiment.

FIG. 3 is a schematic diagram illustrating a reflector profile of the free form reflector in polar coordinates, in accordance with the preferred embodiment. For the finite source, R. Winston and H. Ries have developed a method to design the CHC-type reflector as the function of desired intensity distribution using edge ray method (ERM). If the acceptance angle function is known, the reflector profile can be determined by a set of equations. According to their algorithm, for a narrow, one sided Lambertian strip source, the reflector profile in polar coordinates can be obtained by using the sixth set of equations to produce a constant illuminance on a distant receiver:

$$\begin{cases} B = \cos^2(\theta)[\tan(\theta) + 1] \\ \phi(\theta) = \theta + \arccos\dfrac{B^2 - 1}{B^2 + 1}, \quad \theta_T \leq \theta \leq 0. \\ R(\theta) = \dfrac{(B^2 + 1)}{2\cos^2(\theta)B} \end{cases}$$

If $\theta_T = -\pi/4$, the reflector size will be infinite, so the reflector must be truncated at $\theta = \theta_T$ in practice. In our simulation, the source is a one-sided 2D Lambertian strip source at the origin, the height of the source is 2 mm, and the length of the source is 300 mm. The reflector in 3D space is generated by translating the reflector profile along an X axis for 300 mm. The luminous flux emitted from the source is 3 lumens. The receiver is placed 100 mm away from the source. The simulation is performed by using the Monte-Carlo ray tracing option in a simulation application (i.e., LightTools). For an untruncated reflector, light will be uniformly distributed within $-\pi/4 \leq \theta \leq \pi/4$, which corresponds to vertical $-100$ mm to 100 mm at the 100 mm away receiver plane. Because the length of the strip source and the reflector are 300 mm, the corresponding illuminated zone is a 200×300 mm rectangle at the 100 mm away the receiver plane. Thus, the average illuminance value is 50 luxes. The truncation does not affect the illuminance value of $[\theta_T, -\theta_T]$ angle range.

The simulation results show that the reflectors generated by R. Winston's algorithm can produce a nearly prefect uniform illuminance distribution on the receiver. Such uniform illuminance distribution could also be obtained by using R. Winston's algorithm. In the preferred embodiment, using an application programming language (such as Visual Basic) and an application programming interface (such as a LightTools API), a program is developed to perform the automated NURBS curve profile reflector design. In order to permit convenient description, the reflector generated by utilizing an edge ray method (ERM) is referred to as an ERM reflector, and the reflector generated by utilizing the program is referred to as a DE reflector.

Figure 4:
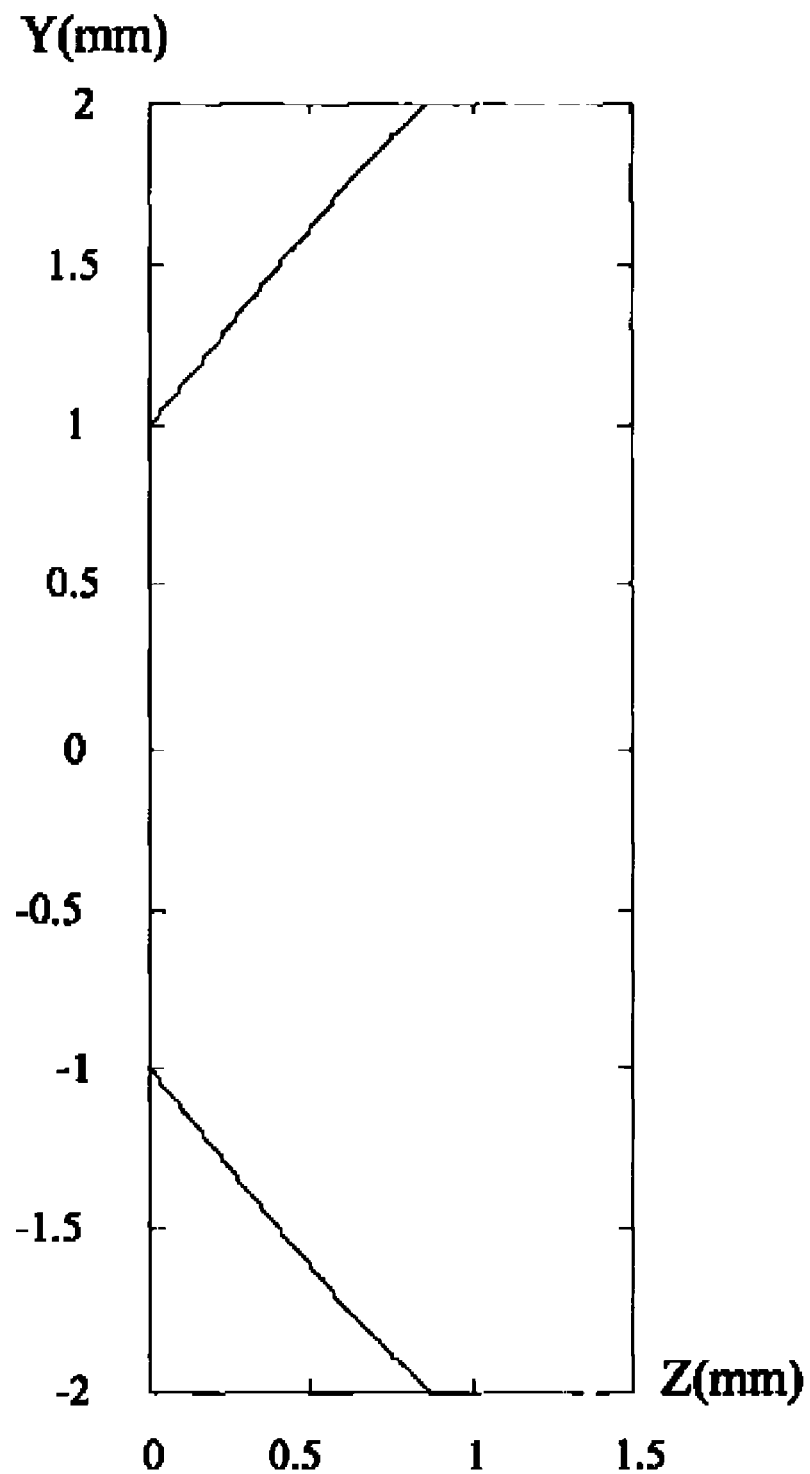
FIG. 4 shows an ERM reflector profile in YZ plane at $\theta_T=-0.513$.
Figure 5:
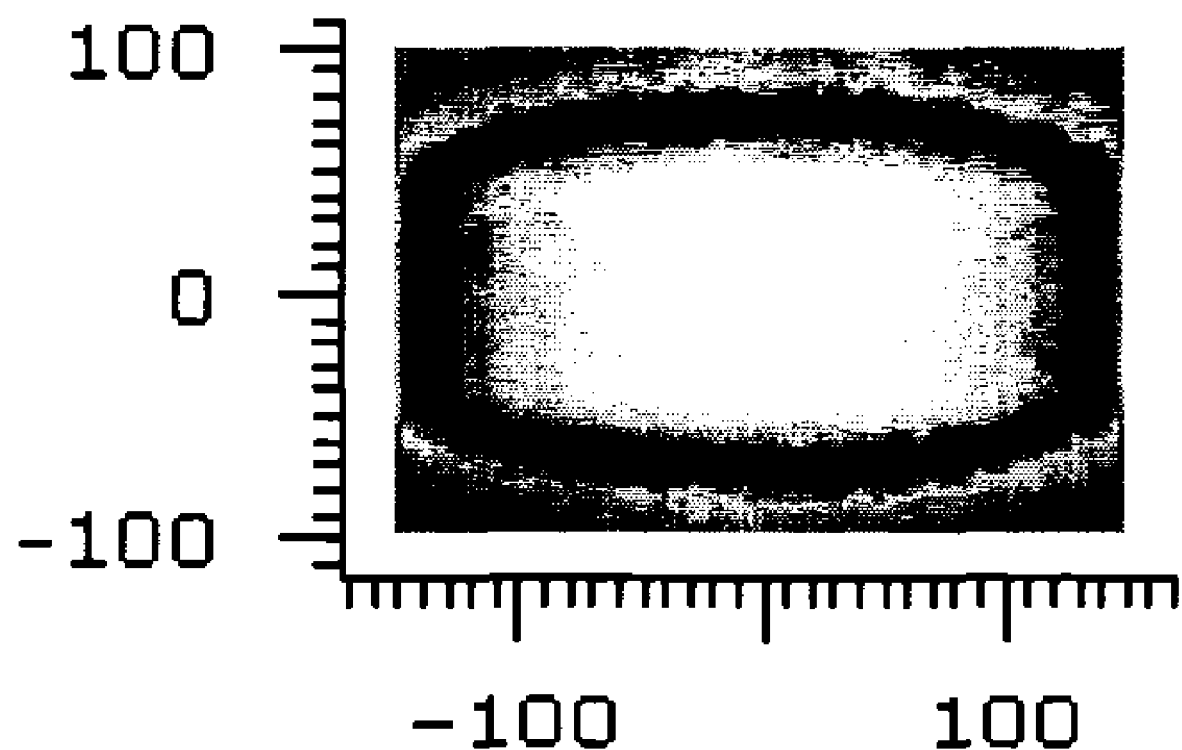
FIG. 5 shows an illuminance distribution of the ERM reflector at $\theta_T=-0.513$.
Figure 6:
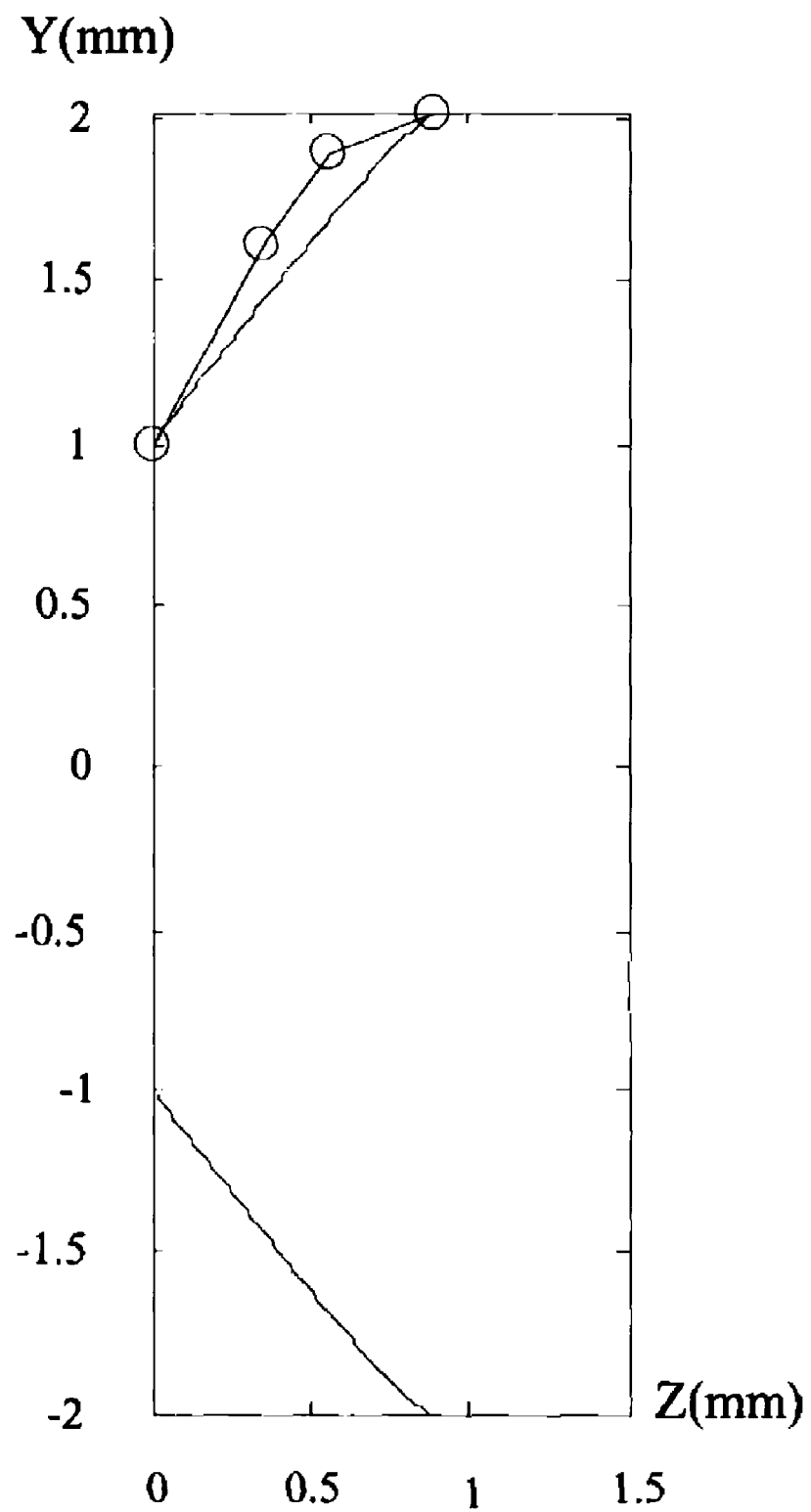
FIG. 6 shows a DE reflector profile in YZ plane at $\theta_T=-0.513$.

A first example shows that both the ERM reflector and the DE reflector have uniform illuminance distributions within $-0.513 \leq \theta \leq 0.513$. Referring to FIG. 4 and FIG. 6, the endpoint coordinates of the reflector profiles are (1, 0) and (2.01, 0.89). In the first example, the ERM reflector is generated by setting $\theta_T = -0.513$ in the sixth set of equations as described above. The ERM reflector profile in YZ plane is obtained as shown in FIG. 4, and the simulation result is shown in FIG. 5. In theory, the length of the ERM reflector and the strip source should be infinite. In the simulation, the ERM reflector and the source length are 300 mm. The limited length alters the desired irradiance distribution, thus, from FIG. 5, it can be seen that the uniform illuminance distribution zone is not a rectangle but a barrel shape, and the illuminance value is a little bit below the theoretical value of 50 lux. The receiver is divided into 39×39 bins.

The reflector profile is represented by a cubic NURBS curve, and four control points are used to define the cubic NURBS curve. The coordinates and weights of the middle two control points are assumed as variables, so there are six variables altogether. If the endpoint coordinates of the NURBS curve coincide with those of the ERM reflector profile endpoint, then the sizes of the DE reflector and the ERM reflector are nearly the same. The coordinates of the NURBS curve endpoints in YZ plane are set to (0, 1) and (0.89, 2.01), respectively. The weights of head and the tail control points are all set to "1". In order to generate a reasonable reflector profile, the lower limit and the upper limit of the Y control point coordinates are respectively set to "1" and "3", and the lower limit and the upper limit of the Z control point coordinate are set to "0" and "0.89", respectively. Our objective is to obtain a uniform illuminance distribution on the receiver within $-0.513 \leq \theta \leq 0.513$ which corresponds to a 112×300 mm rectangle zone on the receiver 100 mm away. For optimization, a 112×300 mm rectangle receiver is set up and is divided into 10×10 bins. The illuminance value of each bin is calculated by LightTools through tracing 10,000 rays and is used in the second equation to calculate the merit evaluation function value. In this example, all the $E_{ij}'$ in the second equation are set to 50 lux and all the $W_{ij}$ are set to "0.0004". The optimization parameters and the source and the receiver parameters are given in Table 1 as follows.

TABLE 1

| Source and receiver parameters | | DE parameters | |
|---|---|---|---|
| Source height | 2 mm | Variable number | M = 6 |
| Source length | 300 mm | Population size | N = 30 |
| Reflector length | 300 mm | Desired illuminance value | 50 Lux |
| Receiver distance | 100 mm | Receiver bin weights | $1/50^2$ |
| Receiver size | 112 × 300 mm | Mutation parameters | $\lambda = 0.55$, $\beta = 0.6$ |
| Receiver bin number | 10 × 10 | Crossover probability | CR = 0.5 |

Figure 7:
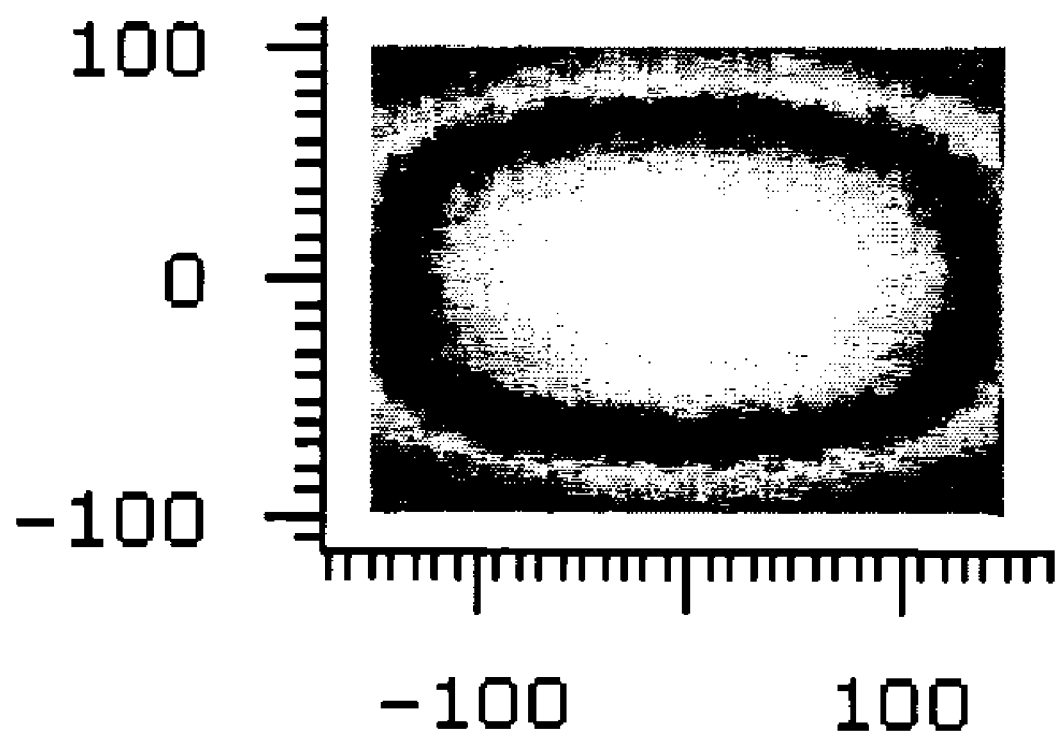
FIG. 7 shows an illuminance distribution of the DE reflector at $\theta_T=-0.513$.
Figure 8:
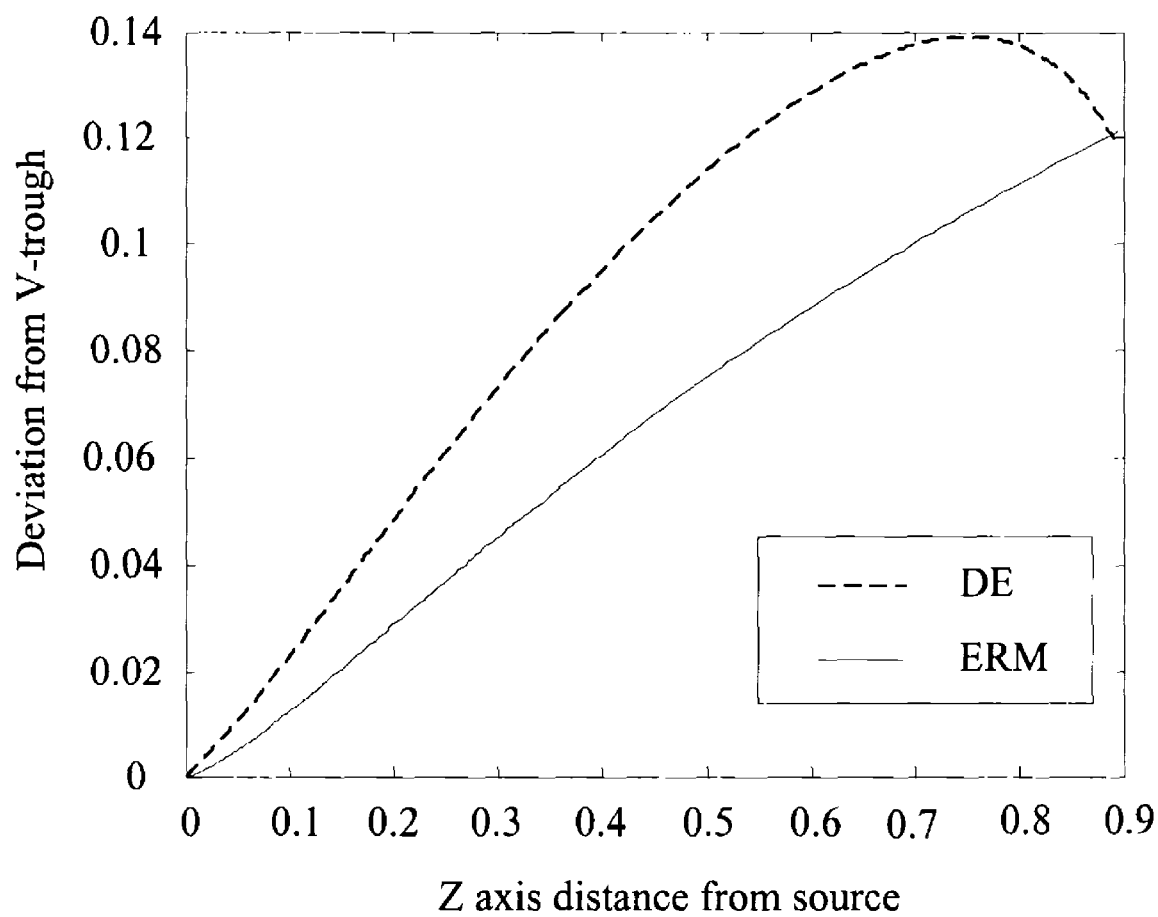
FIG. 8 shows a deviation of the ERM reflector and the DE reflector from a true V-trough within $-0.513 \leq \theta \leq 0.513$.
Figure 9:
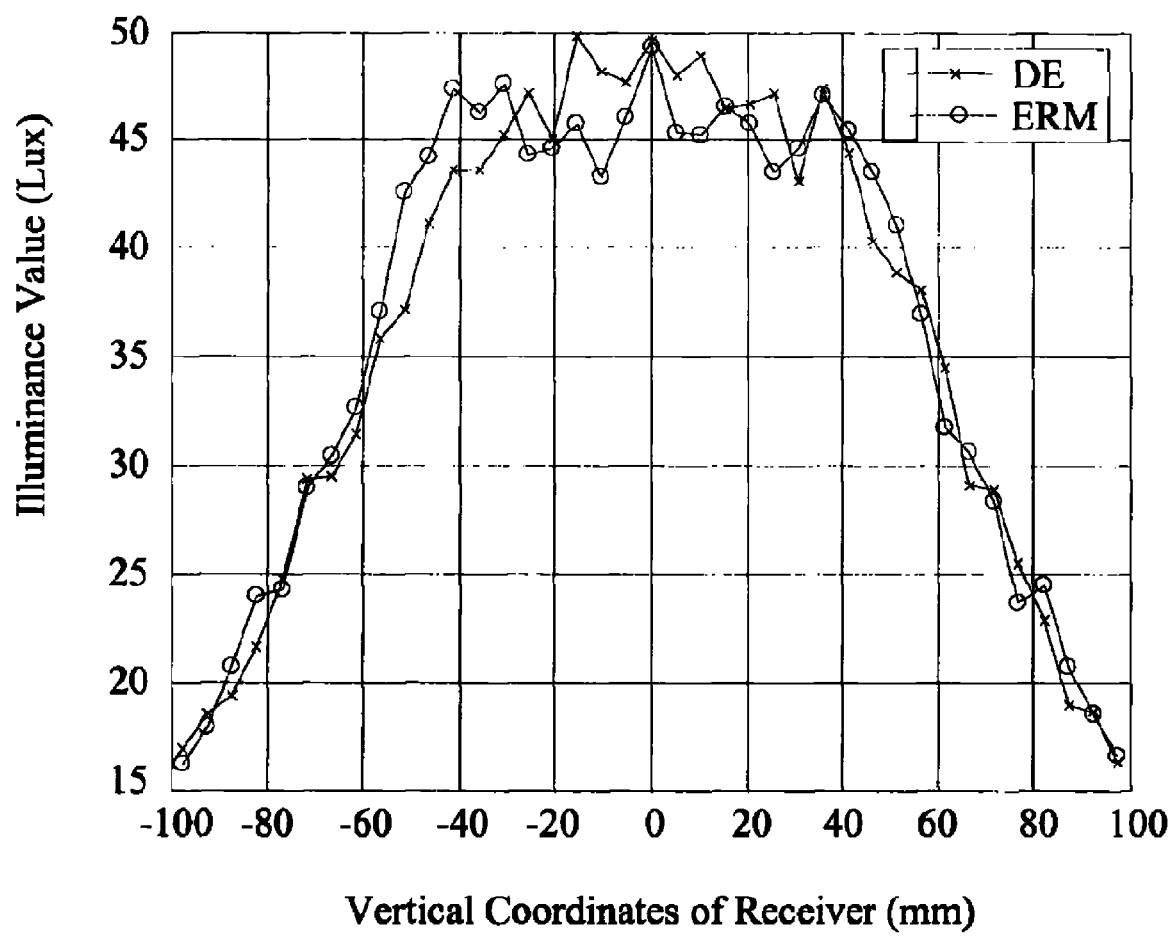
FIG. 9 shows a vertical slice of the ERM reflector and the DE reflector, which produce uniform illuminance distributions with $-0.513 \leq \theta \leq 0.513$.

The DE reflector is obtained after fifty iterations, and the DE reflector profile in YZ plane is shown in FIG. 6. This optimization process costs about four hours of computing time on a computer with Pentium 2.4 GHz CPU and 2 Gbytes RAM. Both the ERM reflector and the DE reflector superficially resemble a V trough. The subtle differences between these two reflectors (the ERM reflector and the DE reflector) and a true V trough are depicted in FIG. 8. After optimization, 1,000,000 rays are traced and a 200×300 mm rectangle receiver is placed 100 mm away from the source. The simulation result produced by DE reflector is shown in FIG. 7. The receiver is divided into 39×39 bins as in the ERM reflector simulation. Vertical cuts through the center of the illuminance distributions are shown in FIG. 9. It can be seen from the simulation results that the DE reflector can generate almost the same uniform illuminance distribution as that of the ERM reflector in $-0.513 \leq \theta \leq 0.513$ angle range. The average illuminance difference of these 39 bins is only 3%.

Figure 10:
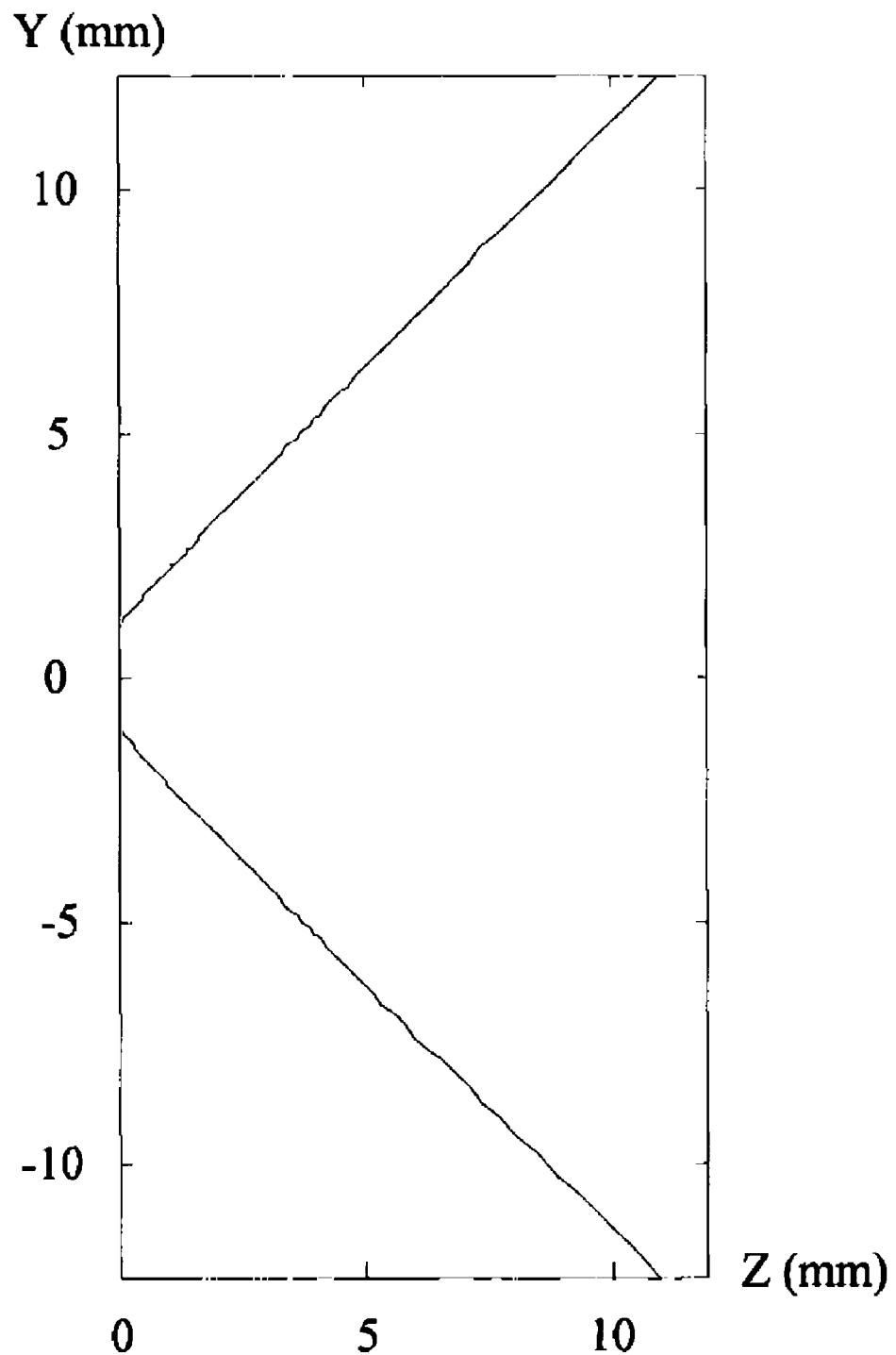
FIG. 10 shows an ERM reflector profile in YZ plane at $\theta_T=-0.733$.
Figure 12:
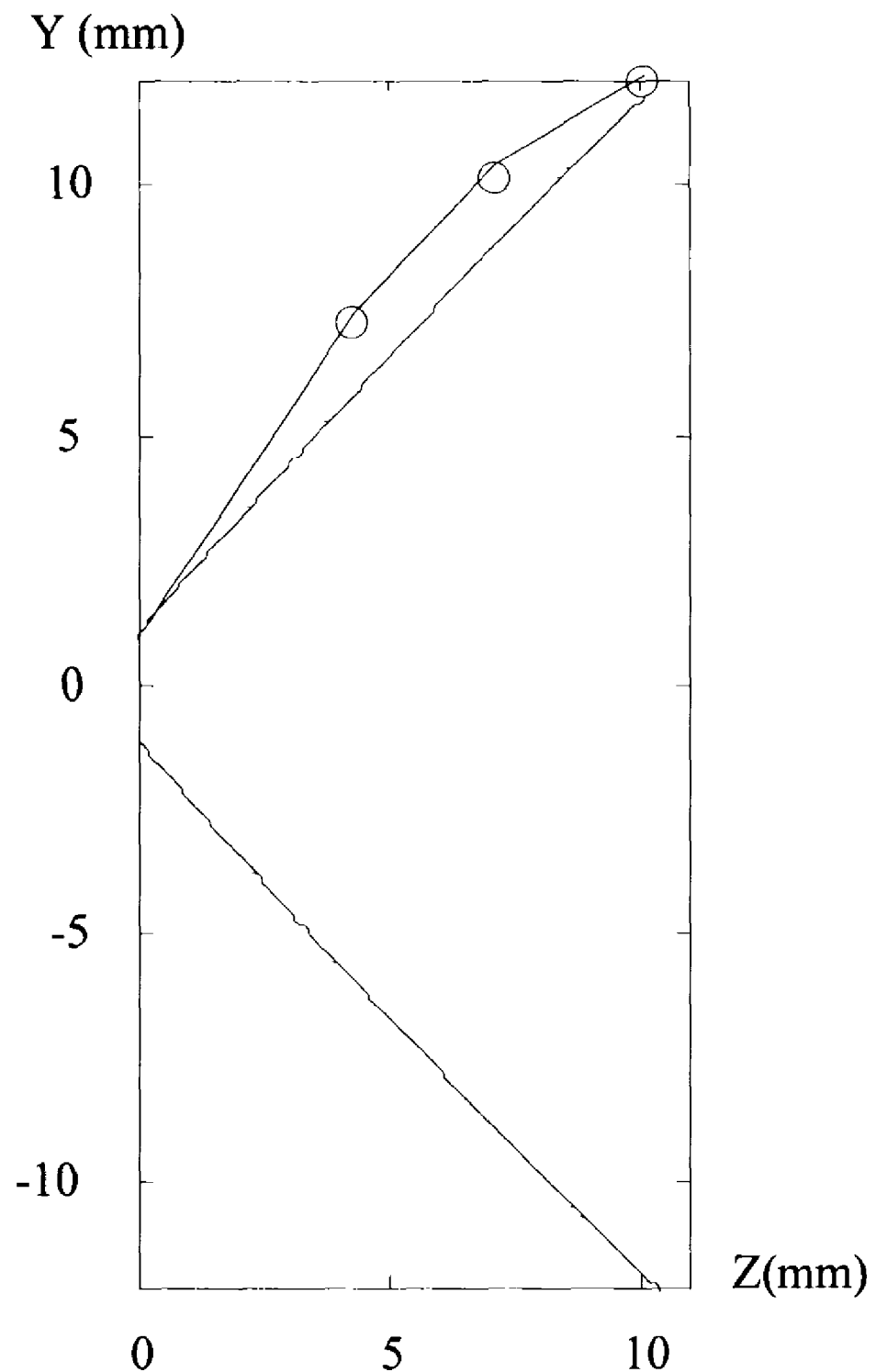
FIG. 12 shows an DE reflector profile in YZ plane at $\theta_T=-0.733$.

A second example shows that both the ERM reflector and the DE reflector have uniform illuminance distribution within $-0.733 \leq \theta \leq 0.733$. Referring to FIG. 10 and FIG. 12, the endpoint coordinates of the ERM reflector profiles are (1, 0) and (12.32, 10.98).

Figure 11:
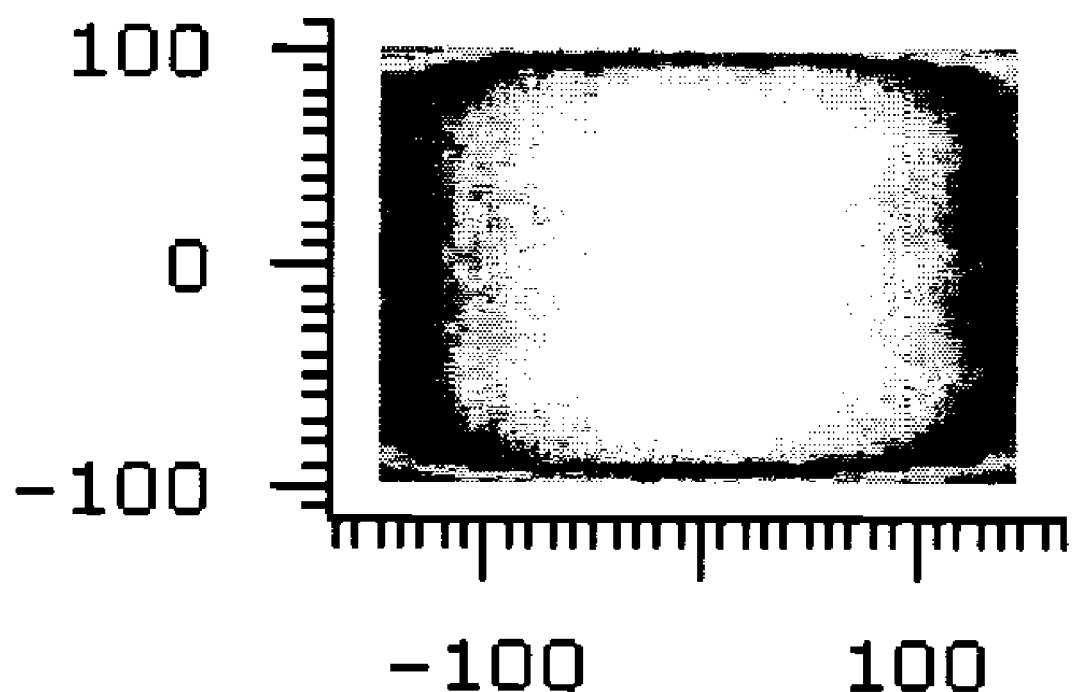
FIG. 11 shows an illuminance distribution of the ERM reflector at $\theta_T=-0.733$.

In the second example, the ERM reflector is generated by setting $\theta_T = -0.733$ in the set of sixth equation as described above. The source used is the same as in the first example. The endpoint coordinates of the ERM reflector profile are (0, 1), (12.32, 10.98) respectively, and the ERM reflector profile in YZ plane is shown in FIG. 10. The simulation result is shown in FIG. 11. As in the first example, four control points are used to represent the NURBS curve. In order to further test the validity of the present algorithm, only the head control point is fixed with coordinates as (1, 0), and a weight value thereof is assigned as "1". The other three control points are all variable. The lower limit and upper limit of the Y control point coordinates are set to "1" and "18", respectively, and the lower limit and the upper limit of the Z control point coordinates are respectively set to "0" and "11". The control point weight ranges are "0" to "1". Thus, there are nine variables altogether. The optimization objective is to generate a uniform illuminance distribution on the receiver within $-0.733 \leq \theta \leq 0.733$ which corresponds to a 180×300 mm rectangle zone on the receiver from 100 mm away, so a 180×300 mm rectangle receiver is set up and is divided into 10×10 bins. All the $E_{ij}'$ in the second equation are still set to 50 lux and all the $W_{ij}$ are set to "0.0004". The optimization parameters and the source and the receiver parameters are given in Table 2 as follows.

TABLE 2

| Source and receiver parameters | | DE parameters | |
|---|---|---|---|
| Source height | 2 mm | Variable number | M = 9 |
| Source length | 300 mm | Population size | N = 36 |
| Reflector length | 300 mm | Desired illuminance value | 50 Lux |
| Receiver distance | 100 mm | Receiver bin weights | $1/50^2$ |
| Receiver size | 180 × 300 mm | Mutation parameter | $\lambda = 0.55$, $\beta = 0.6$ |
| Receiver bin number | 10 × 10 | Crossover probability | CR = 0.3 |

Figure 13:
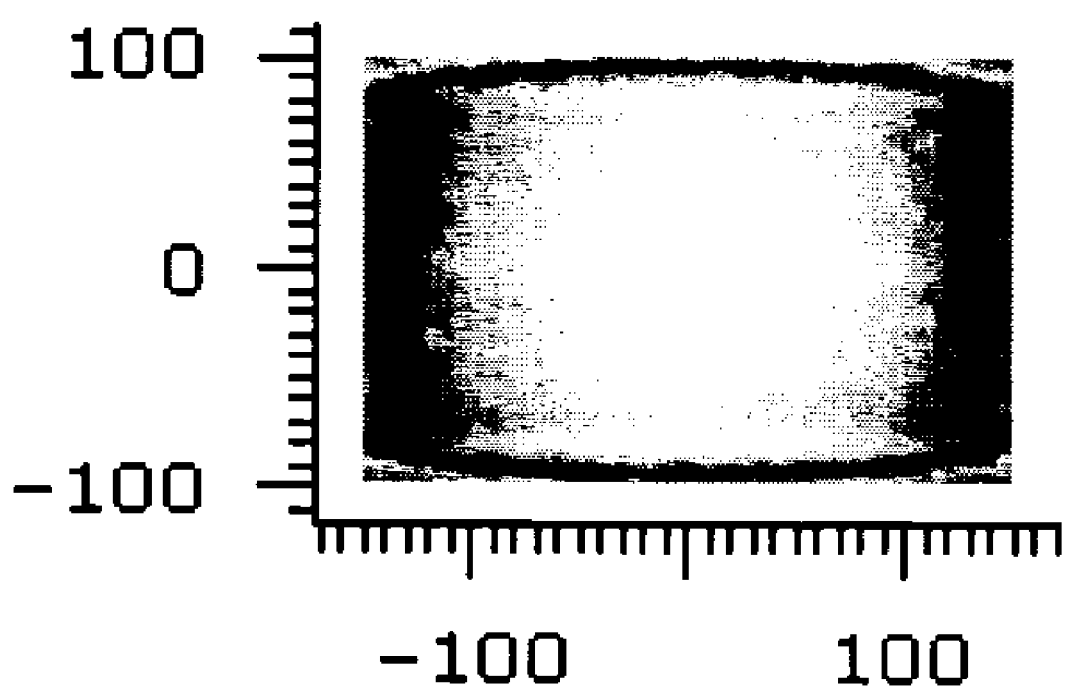
FIG. 13 shows an illuminance distribution of the DE reflector at $\theta_T=-0.733$.
Figure 14:
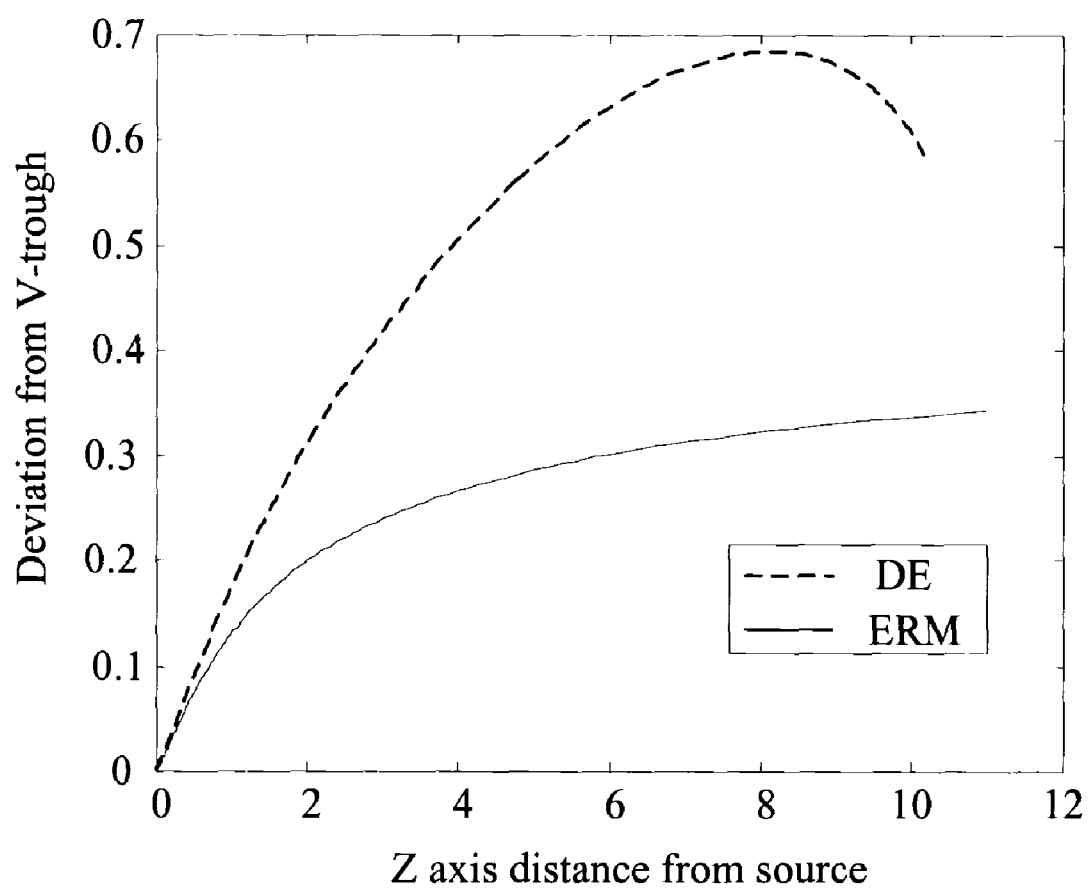
FIG. 14 shows a deviation of the ERM reflector and the DE reflector from a true V-trough within $-0.733 \leq \theta \leq 0.733$.
Figure 15:
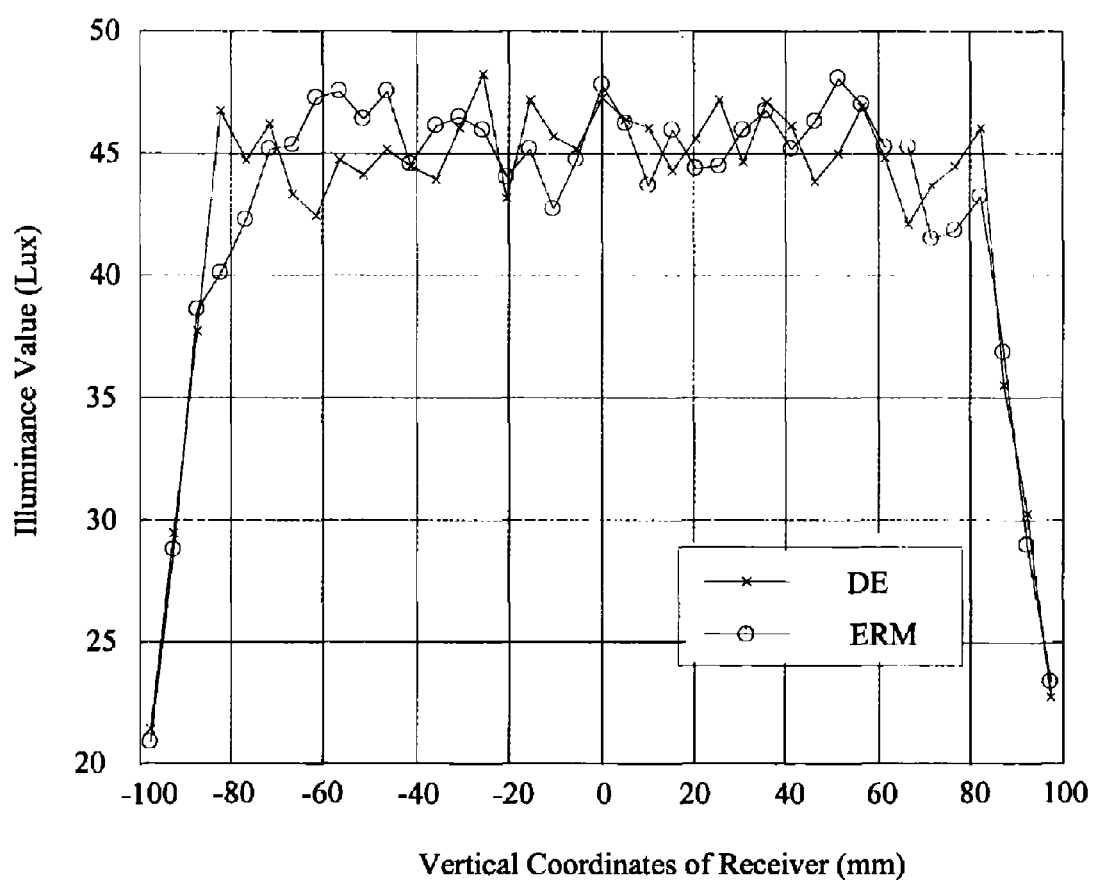
FIG. 15 shows a vertical slice of the ERM reflector and the DE reflector, which produce uniform illuminance distributions with $-0.733 \leq \theta \leq 0.733$.

The DE reflector is obtained after one hundred iterations, and the DE reflector profile is shown in FIG. 12. It costs about eight hours of computing time on a computer with Pentium 2.4 GHz and 2 Gbytes RAM. The differences between these two reflectors (the ERM reflector and the DE reflector) and a true V trough are depicted in FIG. 14. Because the last control point is variable unlike the first example, the obtained DE reflector is a little bit smaller than the ERM reflector. A new receiver with 200×300 mm size is placed 100 mm away from the source and 1,000,000 rays are traced to compare with the optical performance of corresponding ERM reflector after optimization. The simulation result of the DE reflector is shown in FIG. 13. Both receivers are divided into 39×39 bins. Vertical cut through the center of the illuminance distributions are shown in FIG. 15. The average illuminance difference of these 39 bins is only 5%. Although there is one more variable control point in the second example compared with first example, after more iterations (100 times), a satisfying uniform illuminance distribution could also be obtained.

A third example shows a method for designing a free form reflector having a concentrated illuminance distribution. One of the greatest advantages of the NURBS algorithm is their capability of precisely representing conic sections and circles, as well as free form curves and surfaces. It can be proved that if control points are setting to $\{P_i\}=\{(0,0), (2b_0, 0), (2b_0, 2a_0), (0, 2a_0)\}$, wherein $a_0 > b_0$, weights are $$\{w_i\} = \left\{1, \frac{1}{3}, \frac{1}{3}, 1\right\}$$

and knots are $\{0,0,0,0,1,1,1,1\}$, the NURBS curve precisely represents a semi-ellipse with an origin at the left vertex, with the major and minor axes being $a_0$ and $b_0$, respectively. It is well known that if a point source is placed on the one focus of an ellipse, a concentrated illuminance distribution can be obtained at the other focus. In this example, a concentrated illuminance distribution could also be obtained by using the NURBS algorithm proposed in this application.

Figure 16:
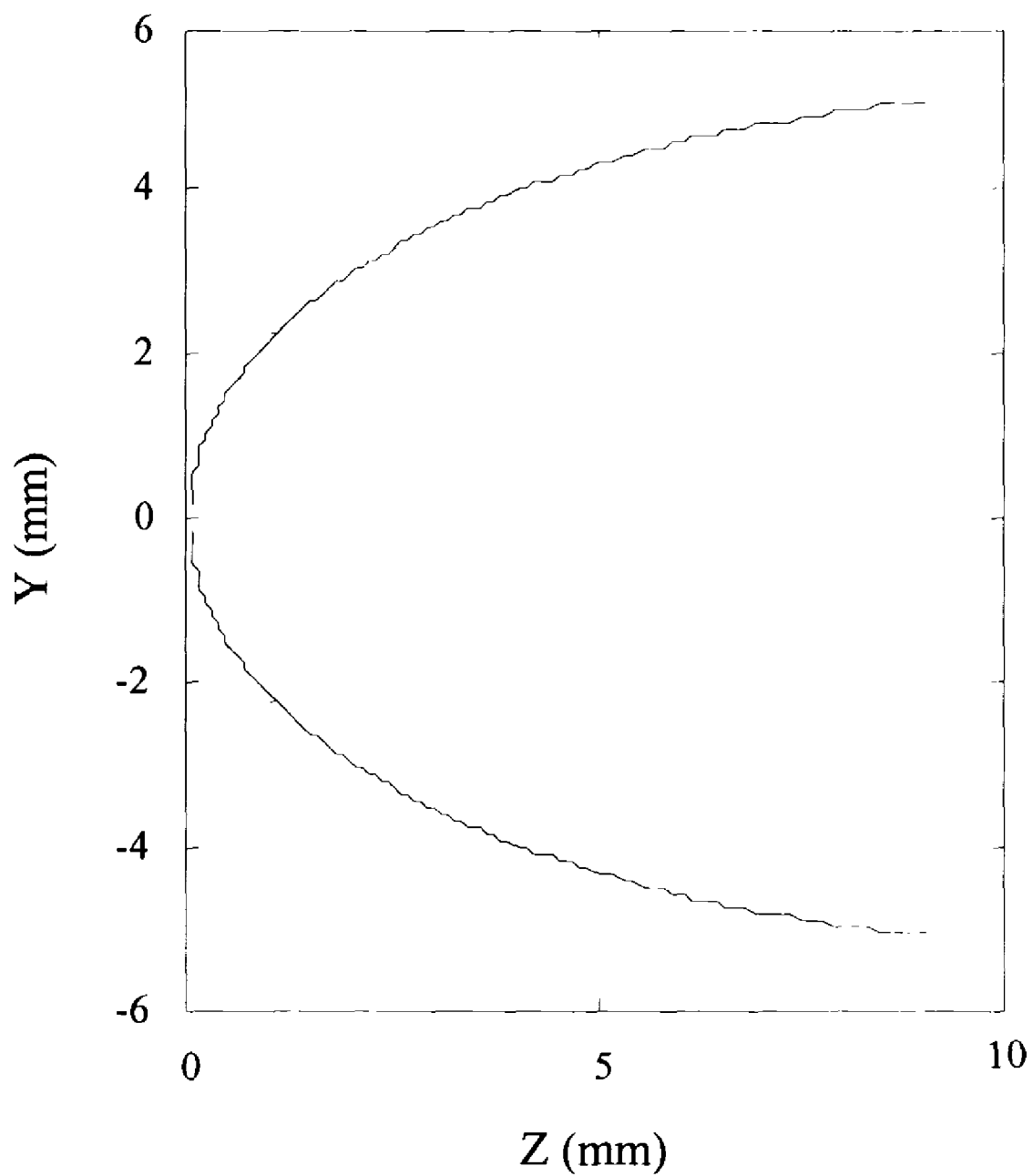
FIG. 16 shows an NURBS reflector profile in YZ plane, which produces a concentrated illuminance distribution.
Figure 17:
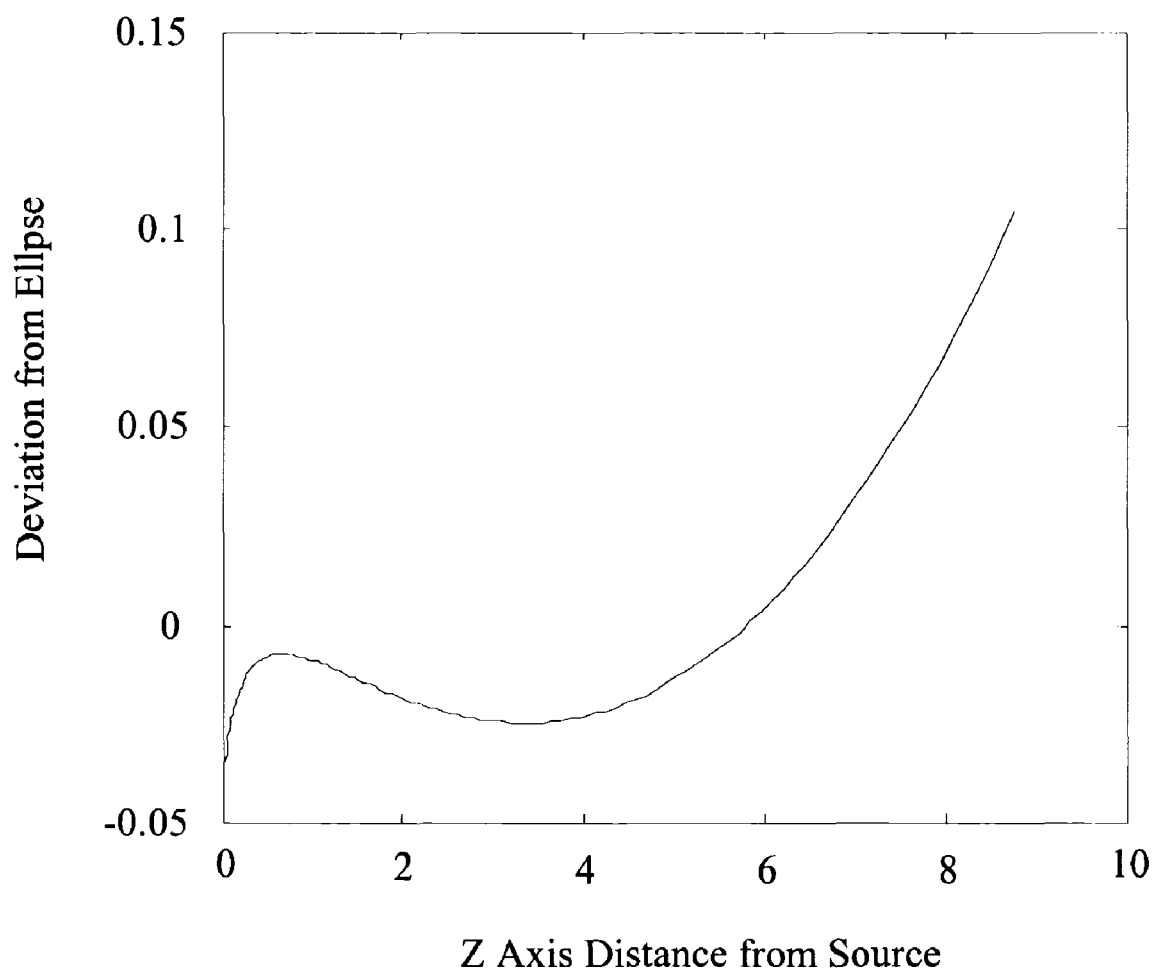
FIG. 17 shows a deviation of the NURBS reflector profile from an ellipse.

FIG. 16 shows the NURBS reflector profile in YZ plane which produces a concentrated illuminance distribution. FIG. 17 shows a deviation of the NURBS reflector profile from an ellipse. In order to describe the NURBS reflector profile, the left half of an elliptical reflector whose profile is defined as the equation $$\frac{y^2}{25} + \frac{(z-10)^2}{100} = 1,$$

and a point source is placed at the left focus of the ellipse. A 10×10 mm receiver is placed at the right focus and divided into 11×11 bins. The emitting angle of the source is properly limited so that the receiver can only receive the reflected rays. After tracing 10,000 rays, a concentrated illuminance distribution can be obtained. It is needed to use an illuminance value of each bin as $E_{ij}'$ in the second equation as described above, which represents the desired illuminance distribution. The illuminance value of the receiver center and the illuminance value of the center bin are infinite in the simulation result, and the illuminance values of all the other bins are "0". Only the head control point is fixed with the coordinates as (0, 0), and the weight is assigned as "1". The coordinates and weights of the other three control points are all variables, so there are nine variables altogether. The lower and upper limits of Y coordinate are "−5" and "15", respectively. The limits of the coordinates of Z control points are "−5" and "25", respectively. The weight limits are correspondingly set to "0" and "1". Because only left half of ellipse is required, the value range of parameter u in the first equation is [0, 0.5]. Using the same source and the same receiver as in the ellipse reflector simulation, the DE algorithm is performed to generate the reflector profile, and the reflector is obtained by the NURBS curve profile by rotating with the Z axis. After one hundred iterations, the NURBS curve profile is obtained as shown in FIG. 16, and the Y coordinate differences of the NURBS curve and the ellipse are shown in FIG. 17.

Figure 18:
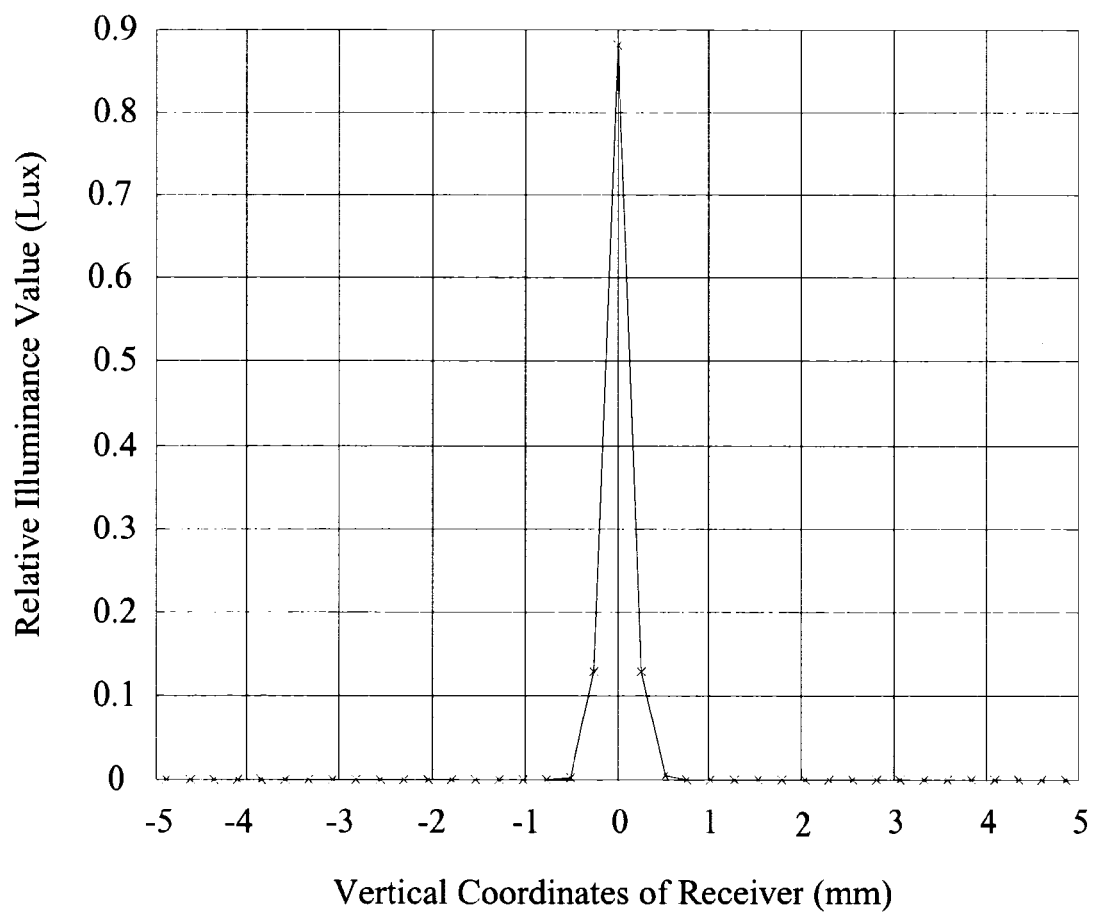
FIG. 18 shows a vertical slice of the relative illuminance distribution produced by the NURBS reflector.

FIG. 18 shows vertical slice of the relative illuminance distribution produced by the NURBS curve reflector. Referring to FIG. 18, it can be seen that the center illuminance value is about 88% of that of the illuminance distribution generated by the ellipse reflector.

In conclusion, reflectors are the core components of many illumination and solar energy systems. According to the system and method for designing a free form reflector, which can automatically design various no-imaging reflectors by using the DE algorithm and the NURBS algorithm generated by the free form reflector design unit 2. The overall result is a simple automated non-imaging reflector design technique, and only a few data such as desired dimensions, desired illuminance distributions and searching limits associated with a desired reflector are needed to be input by user via the user input interface 1. The reflector profile is represented by the NURBS curve in 2D space and then is generated by translational or rotational symmetry. The coordinates of control points of the NURBS curve and weights are used as variables. Compared with the edge ray method, almost the same uniform illuminance distributions can be obtained using the DE algorithm for a given strip source. However, the process is automatic, and there is no need for user to know much theory about the non-imaging reflector design. A desired concentrated illuminance distribution can also be obtained using the DE algorithm. The above-described examples validate that a free form reflector designed by using the NURBS algorithm and the DE algorithm is not only feasible but also effective.

It should be emphasized that the above-described embodiments of the present invention, particularly, any "preferred" embodiments, are merely possible examples of implementations, set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure, and the present invention is protected by the following claims.

What is claimed is:

1. A system for designing a free form reflector, the system comprising:

a user input interface;

a free form reflector design unit installed in a computer, comprising:

a nonuniform rational basis splines (NURBS) algorithm generating module configured for generating an NURBS algorithm according to data received by the user input interface and for describing a free form surface by performing the NURBS algorithm;

a merit evaluation function constructing module configured for constructing a merit evaluation function for calculating the difference between a desired illuminance distribution and a current distribution generated by a receiver;

wherein the merit evaluation function is described as the following equation:

$$F = \sum_{i=1}^{m} \sum_{j=1}^{n} W_{ij}(E_{ij} - E_{ij}')^2,$$

wherein: Wij is the weight value of each bin; Eij, and Eij' are the calculated illuminance value and the desired illuminance value of the bin with the serial number (i and j), respectively;

wherein Eij' is replaced with a constant value E0 in the merit evaluation function, if the uniform illuminance distribution is required on the receiver;

a differential evolution (DE) algorithm generating module configured for generating an DE algorithm for use in determining an optimum free form surface;

wherein the step of generating the DE algorithm comprises the steps of:

(i) randomly generating a gene of an initial chromosome in a population between a maximum value and a minimum value; wherein the gene of the initial chromosome in the population is generated by utilizing the following equation: $X(0)=(X_1(0), X_2(0), \Lambda, X_N(0))$, wherein: $X(0)$ is the initial population; N is the population size; and $X_{best}(0)$ is an optimum chromosome in the initial population;

(ii) calculating a gene of a parent chromosome by utilizing the following equation:

$$V_i(t) = X_i(t) + \lambda[X_{best}(t) - X_i(t)] + \beta[X_{r2}(t) - X_{r1}(t)] = (\overline{V}_1, \overline{V}_2, \Lambda, \overline{V}_j, \Lambda, \overline{V}_M)^T, \quad i=1,2,\Lambda,N,$$

wherein: r1 and r2 are two random integers in [1, N]; λ and β are two parameters; M is the number of variables; and $\overline{V}_j$ is the jth gene of the ith parent chromosome;

(iii) calculating a gene of a child chromosome by utilizing the following equation:

$$\overline{u}_j = \begin{cases} \overline{V}_j, & rand_{ij} \le CR \text{ or } j=Rnd_i \\ [X_i(t)]_j, & \text{others}, \quad j=1,2,\Lambda,M, \end{cases}$$

wherein: CR is the crossover probability, which is depicted as CR∈[0,1]; randij is a random float point number between 0 and 1; and Rndi is a random integer between 1 and M;

(iv) comparing a merit evaluation function value of the child chromosome with a merit evaluation function value of the initial chromosome, and replacing the initial chromosome with the child chromosome in the population if the merit evaluation function value of the child chromosome is smaller than the merit evaluation function value of the initial chromosome;

(v) generating a best chromosome in the next generation of the population by choosing the next chromosome for updating and repeating from step (ii) to the step (iv) until the entire population has been processed; and (vi) repeating step (i) to step (v) until a desired minimum merit evaluation function value has been achieved or until the evolution has attained the maximum iteration times; and a free form surface building module configured for building an optimum free form surface according to the NURBS algorithm, the merit evaluation function, and the DE algorithm; and a free form reflector output unit.

2. The system according to claim 1, wherein the user input interface is configured for receiving, via an input device, various data associated with a desired free form reflector.

3. The system according to claim 1, wherein the free form reflector output module is configured for generating a free form reflector according to the optimum free form surface and for outputting the free form reflector, in the form of a computer-aided design (CAD) drawing, to a display and/or a printer.

4. A computer-enabled method for designing a free form reflector, the method comprising the steps of:

generating a non-uniform rational basis splines (NURBS) algorithm for describing a free form surface by performing the NURBS algorithm;

constructing a merit evaluation function for calculating the difference between a desired illuminance distribution and a current illuminance distribution generated by a receiver;

wherein the merit evaluation function is described as the following equation: F=i=1 m j=1 n W ij (E ij–E ij')2, wherein: W.sub.ij is the weight value of each bin; E.sub.ij, and E.sub.ij' are the calculated illuminance value and the desired illuminance value of the bin with the serial number (i and j), respectively; wherein E.sub.ij' is replaced with a constant value E.sub.0 in the merit evaluation function, if the uniform illuminance distribution is required on the receiver;

generating a differential evolution (DE) algorithm for use in obtaining an optimum free form surface;

wherein the step of generating the DE algorithm comprises the steps of:

(i) randomly generating a gene of an initial chromosome in a population between a maximum value and a minimum value; wherein the gene of the initial chromosome in the population is generated by utilizing the following equation: X(0)=(X.sub.1(0),X.sub.2(0), . . . , X.sub.N(0)), wherein: X(0) is the initial population; N is the population size; and X.sub.best(0) is an optimum chromosome in the initial population;

(ii) calculating a gene of a parent chromosome by utilizing the following equation V i (t)=X i (t)+.lamda. [X best (t)–X i(t)]+.beta. [X r 2 (t)–X r 1 (t)]=(V 1, V 2, V j, V M) T, i=1, 2, . . . , N, wherein: r1 and r2 are two random integers in [1, N]; .lamda. and .beta. are two parameters; M is the number of variables; and V.sub.j is the j.sup.th gene of the i.sup.th parent chromosome;

(iii) calculating a gene of a child chromosome by utilizing the following equation: u j=[V j, rand ij.ltoreq. CR or j=Rnd i [X i (t)] j, others, j=1, 2, . . . , M, wherein: CR is the crossover probability, which is depicted as CR.epsilon. [0,1]; rand.sub.ij is a random float point number between 0 and 1; and Rnd.sub.i is a random integer between 1 and M;

(iv) comparing a merit evaluation function value of the child chromosome with a merit evaluation function value of the initial chromosome, and replacing the initial chromosome with the child chromosome in the population if the merit evaluation function value of the child chromosome is smaller than the merit evaluation function value of the initial chromosome;

(v) generating a best chromosome in the next generation of the population by choosing the next chromosome for updating and repeating from step (ii) to the step (iv) until the entire population has been processed; and (vi) repeating step (i) to step (v) until a desired minimum merit evaluation function value has been achieved or until the evolution has attained the maximum iteration times building an optimum free form surface according to the NURBS algorithm, the merit evaluation function, and the DE algorithm; and generating and outputting a free form reflector according to the optimum free form surface.

5. The method according to claim 4, further comprising the step of receiving various data associated with a desired free form reflector.

6. The method according to claim 5, wherein the data comprises desired dimensions, and desired illuminance distributions and searching limits of the free form reflector.

7. The method according to claim 4, wherein the NURBS algorithm is described as the following equation:

$$\vec{C}(u) = \frac{\sum_{i=0}^{n} N_{i,p}(u) w_i \vec{P}_i}{\sum_{i=0}^{n} N_{i,p}(u) w_i} \quad 0 \leq u \leq 1,$$

wherein: $\vec{C}(u)$ is a vectorial expression of parametric equations; $N_{i,p}(u)$ are B-Spline Basic Functions; $\vec{P}_i$ are vectors of control points; u is a parameter; Wi is the weight for the control point I; p is the basic function degree; and n+1 is the number of the control points.

8. The method according to claim 4, wherein the step (iv) is implemented by $$X_i(t+1) = \begin{cases} U_i(t) & \text{if } F(U_i(t)) < F(X_i(t)) \\ X_i(t) & \text{others,} \end{cases} \quad i = 1, 2, \Lambda, N,$$

wherein F is the merit evaluation function.

* * * * *